(12) United States Patent
Huang et al.

(10) Patent No.: US 11,705,767 B2
(45) Date of Patent: Jul. 18, 2023

(54) ROTOR STRUCTURE, PERMANENT MAGNET AUXILIARY SYNCHRONOUS RELUCTANCE MOTOR AND ELECTRIC VEHICLE

(71) Applicant: GREE ELECTRIC APPLIANCES, INC. OF ZHUHAI, Guangdong (CN)

(72) Inventors: Hui Huang, Zhuhai (CN); Yusheng Hu, Zhuhai (CN); Bin Chen, Zhuhai (CN); Yong Xiao, Zhuhai (CN); Tong Tong, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 188 days.

(21) Appl. No.: 16/980,350

(22) PCT Filed: Dec. 7, 2018

(86) PCT No.: PCT/CN2018/119873
§ 371 (c)(1),
(2) Date: Sep. 11, 2020

(87) PCT Pub. No.: WO2019/174324
PCT Pub. Date: Sep. 19, 2019

(65) Prior Publication Data
US 2021/0257869 A1    Aug. 19, 2021

(30) Foreign Application Priority Data
Mar. 16, 2018    (CN) .................... 201810219481.3

(51) Int. Cl.
*H02K 1/27*    (2022.01)
*H02K 1/276*    (2022.01)
*B60K 1/00*    (2006.01)

(52) U.S. Cl.
CPC .............. *H02K 1/2766* (2013.01); *B60K 1/00* (2013.01); *H02K 2213/03* (2013.01)

(58) Field of Classification Search
CPC .... H02K 1/2766; H02K 29/03; H02K 1/2773; H02K 2213/03; B60K 1/00; Y02T 10/64
(Continued)

(56) References Cited

U.S. PATENT DOCUMENTS 6,008,559 A * 12/1999 Asano .................... H02K 1/276
310/216.073
8,102,091 B2 * 1/2012 Ionel .................... H02K 1/2766
310/156.53
(Continued)

FOREIGN PATENT DOCUMENTS

| CN | 102664475 A | 9/2012 |
| CN | 103280904 A | 9/2013 |

(Continued)

OTHER PUBLICATIONS

Extended European Search Report for European Application No. 18910125.6 dated Mar. 31, 2021 (11 pages).
(Continued)

*Primary Examiner* — Alex W Mok
(74) *Attorney, Agent, or Firm* — J. Miguel Hernandez; James R. Gourley; Carstens, Allen & Gourley, LLP

(57) ABSTRACT

A rotor structure, a permanent magnet auxiliary synchronous reluctance motor and an electric vehicle, the rotor structure includes a rotor body and an outer layer permanent magnet. The rotor body is provided with a magnetic steel slot group. The magnetic steel slot group includes an outer layer magnetic steel slot. The outer layer magnetic steel slot includes a plurality of magnetic steel slot segments. At least two of the plurality of magnetic steel slot segments are arranged in a radial direction of the rotor body and are disposed oppo-
(Continued)

sitely at both sides of a direct axis of the rotor body. The outer layer permanent magnet is arranged in the magnetic steel slot segment, a length of the outer permanent magnet disposed in the two oppositely arranged magnetic steel slot segments is L, and a maximum distance between the two oppositely arranged magnetic steel slot segments is C, where $0.8 \times C \leq L$.

18 Claims, 10 Drawing Sheets

(58) Field of Classification Search
USPC .................................................. 310/156.56
See application file for complete search history.

(56) References Cited

U.S. PATENT DOCUMENTS

| | | | | |
|---|---|---|---|---|
| 9,461,510 | B2* | 10/2016 | Lillington | ................ H02K 1/28 |
| 2002/0153796 | A1* | 10/2002 | Yoshinaga | ............. H02K 21/14 |
| | | | | 310/156.48 |
| 2002/0171309 | A1 | 11/2002 | Wakui et al. | |
| 2003/0094875 | A1* | 5/2003 | Sakuma | ................ H02K 21/14 |
| | | | | 310/156.56 |
| 2013/0320797 | A1* | 12/2013 | Vyas | .................... H02K 1/2766 |
| | | | | 310/156.43 |
| 2014/0028139 | A1 | 1/2014 | Hamer et al. | |
| 2014/0346911 | A1* | 11/2014 | Tsuchida | ................ H02K 1/246 |
| | | | | 310/156.53 |
| 2016/0028279 | A1 | 1/2016 | Hao et al. | |
| 2017/0187257 | A1* | 6/2017 | Liu | ........................ H02K 21/16 |

FOREIGN PATENT DOCUMENTS

| | | |
|---|---|---|
| CN | 203219035 U | 9/2013 |
| CN | 204992999 U | 1/2016 |
| CN | 105305682 A | 2/2016 |
| CN | 205566051 U | 9/2016 |
| CN | 106026597 A | 10/2016 |
| CN | 106787316 A | 5/2017 |
| CN | 107565723 A | 1/2018 |
| CN | 206850538 U | 1/2018 |
| CN | 108336844 A | 7/2018 |
| EP | 3261220 A1 | 12/2017 |
| JP | 2013066339 A | 4/2013 |
| WO | 2006047519 A2 | 5/2006 |

OTHER PUBLICATIONS

International Search Report for Application No. PCT/CN2018/119873 dated Mar. 7, 2019 (3 pages).

* cited by examiner

ROTOR STRUCTURE, PERMANENT MAGNET AUXILIARY SYNCHRONOUS RELUCTANCE MOTOR AND ELECTRIC VEHICLE

CROSS REFERENCE TO RELATED APPLICATION

This application claims all benefits accruing under 35 U.S.C. § 119 from China Patent Application No. 201810219481.3, filed on Mar. 16, 2018 in the China National Intellectual Property Administration, the entire content of which is hereby incorporated by reference. This application is a national phase under 35 U.S.C. § 120 of international patent application PCT/CN2018/119873, entitled "ROTOR STRUCTURE, PERMANENT MAGNET AUXILIARY SYNCHRONOUS RELUCTANCE MOTOR AND ELECTRIC VEHICLE" filed on Dec. 7, 2018, and published as WO 2019/174324 on Sep. 19, 2019, the content of which is also hereby incorporated by reference.

TECHNICAL FIELD

The present disclosure relates to the technical field of motor equipment, in particular, to a rotor structure, a permanent magnet auxiliary synchronous reluctance motor and an electric vehicle.

BACKGROUND

Electric vehicles have the characteristics of energy saving and environmental friendship, and have developed rapidly. In order to achieve functions of high power density and high efficiency of motors, more and more existing driving motors of electric vehicles use high-performance rare earth permanent magnet motors. Mainly relying on a high-performance rare earth permanent magnet, the rare earth permanent magnet motor can achieve high efficiency and high power density, and currently, the most widely used rare earth permanent magnets are neodymium iron boron rare earth permanent magnets. However, rare earth is a non-renewable resource, and the price of rare earth is relatively expensive and fluctuates greatly, resulting in higher production costs of the drive motor of the electric vehicle, which is terribly unfavorable for promoting the comprehensive development of the electric vehicle. Further, in the prior art, ferrite permanent magnet auxiliary synchronous reluctance motors are also applied to electric vehicles, but such motors have problems of high noise, being easily demagnetized, and low efficiency.

SUMMARY

The present disclosure relates to a rotor structure, a permanent magnet auxiliary synchronous reluctance motor and an electric vehicle to solve a problem of low efficiency of the motor in the prior art. According to one aspect of the present disclosure, a rotor structure is provided. The rotor structure includes: a rotor body, wherein, the rotor body is provided with a magnetic steel slot group; the magnetic steel slot group comprises an outer layer magnetic steel slot; the magnetic steel slot group comprises a plurality of magnetic steel slot segments; and at least two of the plurality of the magnetic steel slot segments are arranged in a radial direction of the rotor body and disposed oppositely on both sides of a direct axis of the rotor body; and an outer layer permanent magnet, wherein, the outer layer permanent magnet is arranged in the magnetic steel slot segment; a length of the outer layer permanent magnet disposed in two oppositely arranged magnetic steel slot segments is L; a maximum distance between the two oppositely arranged magnetic steel slot segments is C; and $0.8 \times C \leq L$.

Further, the plurality of the magnetic steel slot segments includes: a first magnetic steel slot segment, wherein, a first end of the first magnetic steel slot segment extends toward a rotating shaft hole of the rotor body; a second end of the first magnetic steel slot segment extends toward an outer edge of the rotor body; and the first magnetic steel slot segment is disposed at a first side of the direct axis; and a second magnetic steel slot segment, wherein, the second magnetic steel slot segment is arranged opposite to the first magnetic steel slot segment and disposed at a second side opposite to the first side of the direct axis; a first end of the second magnetic steel slot segment is extends toward the rotating shaft hole; and a second end of the second magnetic steel slot segment extends toward the outer edge of the rotor body.

Further, the outer layer magnetic steel slot further includes: a first bent slot, wherein a first end of the first bent slot is communicated with the second end of the first magnetic steel slot segment, and a second end of the first bent slot extends toward the outer edge of the rotor body and gradually approaches one quadrature axis of the rotor body; and a second bent slot, wherein a first end of the second bent slot is communicated with the second end of the second magnetic steel slot segment, and a second end of the second bent slot extends toward the outer edge of the rotor body and gradually approaching another quadrature axis.

Further, a width of at least one of the first bent slot and the second bent slot gradually decreases outward in a radial direction of the rotor body.

Further, the plurality of the magnetic steel slot segments further includes a third magnetic steel slot segment; a first end of the third magnetic steel slot segment is communicated with the first end of the first magnetic steel slot segment, and a second end of the third magnetic steel slot segment is communicated with the first end of the second magnetic steel slot segment.

Further, the first magnetic steel slot segment and the second magnetic steel slot segment form a V-shaped structure magnetic steel slot, or the first magnetic steel slot segment, the second magnetic steel slot segment and the third magnetic steel slot segment form a U-shaped magnetic steel slot.

Further, D3 denotes a distance from a midpoint of a side wall, adjacent to the outer edge of the rotor body, of the second end of the first bent slot, to an intersection point of an extension line of a geometric centerline of the first magnetic steel slot segment and an outer edge of the rotor body adjacent to the second end of the first bent slot, and M denotes a width of the second end of the first magnetic steel slot segment, where $0.6M \leq D3$.

Further, a first magnetic barrier bridge is formed between the second end of the first bent slot and the outer edge of the rotor body; $0.4 \times M \leq (H-H1)$, or $0.4 \times M (H-H1) \leq 2 \times M$; M denotes the width of the second end of the first magnetic steel slot segment; H denotes a distance from the second end of the first magnetic steel slot segment to the outer edge of the rotor body; and H1 denotes a width of the first magnetic barrier bridge.

Further, 0.25×M≤D1≤0.8×M, or 0.3×M≤D1≤0.45×M. M denotes the width of the second end of the first magnetic steel slot segment, and D1 denotes a width of the second end of the first bent slot.

Further, the magnetic steel slot group further includes an inner layer magnetic steel slot; the inner layer magnetic steel slot is disposed on an inner side of the outer layer magnetic steel slot and adjacent to the rotating shaft hole; a magnetic flux conducting path is formed between the outer layer magnetic steel slot and the inner layer magnetic steel slot; and the inner layer magnetic steel slot comprises a first inner layer magnetic steel slot segment, a second inner layer magnetic steel slot segment and a third inner layer magnetic steel slot segment arranged in sequence; the first inner layer magnetic steel slot segment, the second inner layer magnetic steel slot segment and the third inner layer magnetic steel slot segment are communicated with one after another to form a U-shaped structure with an opening toward the outer edge of the rotor body; or the first inner layer magnetic steel slot segment, the second inner layer magnetic steel slot segment and the third inner layer magnetic steel slot segment are arranged at intervals in sequence, and second magnetic barrier bridges are respectively formed between the first inner layer magnetic steel slot segment and the second inner layer magnetic steel slot segment which are adjacent, and between the second inner layer magnetic steel slot segment and the third inner layer magnetic steel slot segment which are adjacent.

Further, the first inner layer magnetic steel slot segment includes a third bent slot; a first end of the third bent slot is communicated with an end of the first inner layer magnetic steel slot segment, which is adjacent to the outer edge of the rotor body; and a second end of the third bent slot extends toward the outer edge of the rotor body and gradually approaches the one quadrature axis; the third inner layer magnetic steel slot segment includes a fourth bent slot; a first end of the fourth bent slot is communicated with an end of the third inner layer magnetic steel slot segment, which is adjacent to the outer edge of the rotor body; and a second end of the fourth bent slot extends toward the outer edge of the rotor body and gradually approaches the other quadrature axis.

Further, an included angle A1 is formed between extension lines of side walls of the first bent slot and the second bent slot; the side walls of the first bent slot and the second bent slot are adjacent to the direct axis; an included angle A is formed between extension lines of side walls of the first magnetic steel slot segment and the second magnetic steel slot segment; and the side walls of the first magnetic steel slot segment and the second magnetic steel slot segment are adjacent to the direct axis, where 2×A≤A1.

Further, an included angle B1 is formed between extension lines of side walls of the third bent slot and the fourth bent slot; the side walls of the third bent slot and the fourth bent slot are adjacent to the direct axis; an included angle B is formed between extension lines of side walls of the first inner layer magnetic steel slot segment and the third inner layer magnetic steel slot segment; and the side walls of the first inner layer magnetic steel slot segment and the third inner layer magnetic steel slot segment are adjacent to the direct axis, wherein 2×B≤B1.

Further, 1.1×B1≤A1.

Further, the rotor structure further includes an inner layer permanent magnet, and the inner layer permanent magnet is arranged in the inner layer magnetic steel slot.

Further, a fifth included angle α1 is formed the direct axis of the rotor body and a straight line drawn between a center of the rotor body and a point, at which a side edge of the outer layer permanent magnet adjacent to the direct axis of the rotor body and a surface of the outer layer permanent magnet adjacent to an edge of the rotor body intersect; and a sixth included angle α2 is formed between the direct axis of the rotor body and a straight line drawn between the center of the rotor body and a point, at which a side edge of the inner layer permanent magnet adjacent to the direct axis of the rotor body and a surface of the inner layer permanent magnet adjacent to the edge of the rotor body intersect, where 1.3×(sin α1/sin α2)≤S1/S2≤2×(sin α1/sin α2), S1 denotes a surface area of one side of the outer layer permanent magnet adjacent to the direct axis of the rotor body, and S2 denotes a surface area of one side of the inner layer permanent magnet adjacent to the direct axis of the rotor body; or 1.5×(sin α1/sin α2)≤S1/S2≤1.8×(sin α1/sin α2).

According to another aspect of the present disclosure, a permanent magnet auxiliary synchronous reluctance motor is provided, and the motor includes any one of the rotor structures above.

According to another aspect of the present disclosure, an electric vehicle is provided, and the electric vehicle includes any one of the rotor structures above.

By applying the technical solutions of the present disclosure, and by arranging the outer layer magnetic steel slot of the magnetic steel slot group on the rotor body, more permanent magnets can be placed in a unit volume of the rotor, thereby generating a larger permanent magnet torque, improving a q-axis inductance of the motor, increasing efficiency of the motor, reducing torque ripples of the motor, reducing vibrations and noises of the motor, and improving an anti-demagnetization ability of the motor.

BRIEF DESCRIPTION OF THE DRAWINGS

The accompanying drawings, which form a part of the present disclosure, are used to provide a further understanding of the present disclosure. The illustrative embodiments of the present disclosure and the description thereof are used to explain the present disclosure, and do not constitute an improper limitation on the present disclosure. In the drawings.

DETAILED DESCRIPTION OF THE EMBODIMENTS

It should be noted that the embodiments in the present disclosure and the features in the embodiments can be combined with each other if there is no conflict. The present disclosure will be described in detail below with reference to the drawings and in conjunction with the embodiments.

As shown in FIGS. 1-12, according to embodiments of the present disclosure, a rotor structure is provided.

Specifically, the rotor structure includes a rotor body and outer layer permanent magnet. The rotor body 10 is provided with a magnetic steel slot group. The magnetic steel slot group includes an outer layer magnetic steel slot 11. The outer layer magnetic steel slot 11 includes a plurality of magnetic steel slot segments. At least two of the plurality of magnetic steel slot segments are arranged in a radial direction of the rotor body 10 and are disposed oppositely on both sides of a direct axis of the rotor body 10. The outer layer permanent magnet 20 is arranged in the magnetic steel slot segment. A length of the outer layer permanent magnet 20 disposed in the two oppositely arranged magnetic steel slot segments is L, and a maximum distance between the two oppositely arranged magnetic steel slot segments is C, where $0.8 \times C \leq L$.

In this embodiment, by arranging the outer layer magnetic steel slot of the magnetic steel slot group on the rotor body, more permanent magnets can be placed in a unit volume of the rotor, thereby generating a larger permanent magnet torque, improving a q-axis inductance of the motor, increasing efficiency of the motor, reducing torque ripples of the motor, reducing vibrations and noises of the motor, and improving an anti-demagnetization ability of the motor.

Figure 1:
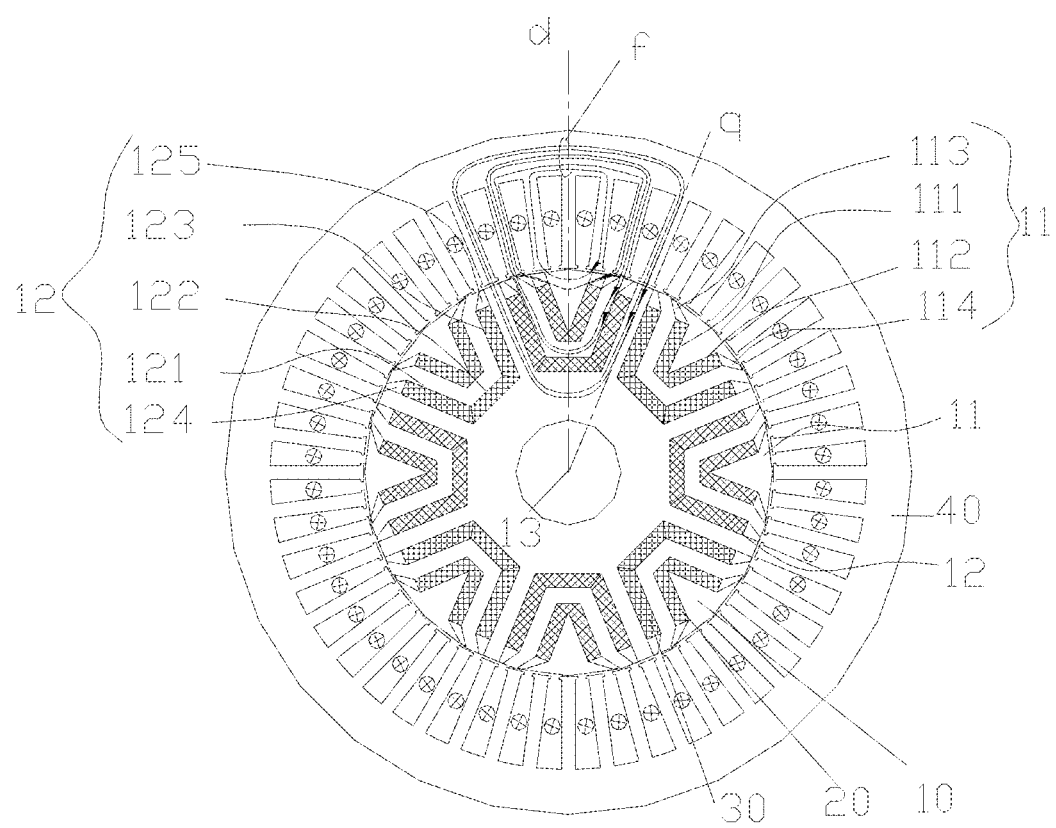
FIG. 1 shows a schematic cross-sectional structure diagram of a first embodiment of a rotor structure according to the present disclosure.

As shown in FIG. 1, the plurality of magnetic steel slot segments includes a first magnetic steel slot segment 111 and a second magnetic steel slot segment 112. A first end of the first magnetic steel slot segment 111 extends toward a rotating shaft hole 13 of the rotor body 10. A second end of the first magnetic steel slot segment 111 extends toward an outer edge of the rotor body 10. The first magnetic steel slot segment 111 is disposed at a first side of the direct axis. The second magnetic steel slot segment 112 is arranged opposite to the first magnetic steel slot segment 111 and is disposed at a second side opposite to the first side of the direct axis. A first end of the second magnetic steel slot segment 112 extends toward the rotating shaft hole 13 of the rotor body 10. A second end of the second magnetic steel slot segment 112 extends toward the outer edge of the rotor body 10. Such an arrangement facilitates conducting magnetic flux lines in a magnetic flux conducting path high efficiently.

In an embodiment, the outer layer magnetic steel slot 11 further includes a first bent slot 113. A first end of the first bent slot 113 is communicated with the second end of the first magnetic steel slot segment 111. A second end of the first bent slot extends toward the outer edge of the rotor body 10 and spreads gradually away from the direct axis. Such an arrangement can make an effect of conducting the magnetic flux lines better, thereby obtaining a larger q-axis inductance.

The outer layer magnetic steel slot 11 further includes a second bent slot 114. A first end of the second bent slot 114 is communicated with the second end of the second magnetic steel slot segment 112. A second end of the second bent slot 114 extends toward the outer edge of the rotor body 10 and gradually approaches a quadrature axis of the rotor body. Such an arrangement can make the effect of guiding the magnetic flux lines better, thereby obtaining a larger q-axis inductance.

Further, a width of at least one of the first bent slot 113 and the second bent slot 114 gradually decreases outward in the radial direction of the rotor body 10. Such an arrangement further regulates a distribution of the magnetic flux lines of each magnetic conducting, thereby reducing local saturation.

In an embodiment, the plurality of magnetic steel slot segments further includes a third magnetic steel slot segment 115. A first end of the third magnetic steel slot segment 115 is communicated with the first end of the first magnetic steel slot segment 111. A second end of the third magnetic steel slot segment 115 is communicated with the first end of the second magnetic steel slot segment 112. Such an arrangement facilitates conducting magnetic flux lines in a magnetic flux conducting path high efficiently.

In an embodiment, the first magnetic steel slot segment 111 and the second magnetic steel slot segment 112 form a V-shaped magnetic steel slot, alternatively the first magnetic steel slot segment 111, the second magnetic steel slot segment 112 and the third magnetic steel slot segment 115 form a U-shaped magnetic steel slot. Such an arrangement can make the magnetic flux lines of a stator to be conducted into each magnetic flux conducting path better and more evenly.

In an embodiment, D3 denotes a distance from a midpoint of a side wall, adjacent to the outer edge of the rotor body 10, of the second end of the first bent slot 113, to an intersection point of an extension line of a geometric centerline of the first magnetic steel slot segment 111 and an outer edge of the rotor body 10 adjacent to the second end of the first bent slot 113. A width of the second end of the first magnetic steel slot segment 111 is M, where $0.6M \leq D3$. Such an arrangement can make the effect of conducting the magnetic flux lines better, thereby obtaining a larger q-axis inductance.

Further, a first magnetic barrier bridge is formed between the second end of the first bent slot 113 and the outer edge of the rotor body 10, where $0.4 \times M \leq (H-H1)$, or $0.4 \times (H-H1) \leq 2 \times M$, M denotes the width of the second end of the first magnetic steel slot segment 111, and H denotes a distance from the second end of the first magnetic steel slot segment 111 to the outer edge of the rotor body 10, and H1 denotes a width of the first magnetic barrier bridge. Such an arrangement can make the effect of conducting the magnetic flux lines better, thereby obtaining a larger q-axis inductance.

$0.25 \times M \leq D1 \leq 0.8 \times M$, or $0.3 \times M \leq D1 \leq 0.45 \times M$ is satisfied, where M is the width of the second end of the first magnetic steel slot segment 111, and D1 is a width of the second end of the first bent slot 113. Such an arrangement makes it easy for the magnetic flux lines to pass through the magnetic barrier bridge between the magnetic steel slot of the rotor and the outer circle of the rotor, thereby obtaining a large difference between of the quadrature axis and the direct axis inductance, and improving reluctance torque of the motor.

In an embodiment, the magnetic steel slot group further includes an inner layer magnetic steel slot 12. The inner layer magnetic steel slot 12 is disposed on an inner side of the outer layer magnetic steel slot 11 and adjacent to the rotating shaft hole 13 of the rotor body 10. A magnetic flux conducting path is formed between the outer layer magnetic steel slot 11 and the inner layer magnetic steel slot 12. The inner layer magnetic steel slot 12 includes a first inner layer magnetic steel slot segment 121, a second inner layer magnetic steel slot segment 122 and a third inner layer magnetic steel slot segment 123 arranged in sequence. The first inner layer magnetic steel slot segment 121, the second inner layer magnetic steel slot segment 122, and the third inner layer magnetic steel slot segment 123 are communicated with one after another to form a U-shaped structure with an opening toward the outer edge of the rotor body 10. Alternatively, the first inner layer magnetic steel slot segment 121, the second inner layer magnetic steel slot segment 122 and the third inner layer magnetic steel slot segment 123 are arranged at intervals in sequence. Second magnetic barrier bridges are respectively formed between the first inner layer magnetic steel slot segment 121 and the second inner layer magnetic steel slot segment 122 which are adjacent, and the adjacent second inner layer magnetic steel slot segment 122 and third inner layer magnetic steel slot segment 123 which are adjacent. Such an arrangement enhances mechanical strength of the rotor.

In an embodiment, the first inner layer magnetic steel slot segment 121 includes a third bent slot 124. A first end of the third bent slot 124 is communicated with an end of the first inner layer magnetic steel slot segment 121, which is adjacent to the outer edge of the motor body 10. A second end of the third bent slot 124 extends toward the outer edge of the rotor body 10 and gradually approaches one quadrature axis. The third inner layer magnetic steel slot segment 123 includes a fourth bent slot 125. A first end of the fourth bent slot 125 is communicated with an end of the third inner layer magnetic steel slot segment 123, which is adjacent to the outer edge of the rotor body 10. A second end of the fourth bent slot 125 extends toward the outer edge of the rotor body 10 and gradually approaches another quadrature axis. Each of the bent slots of the magnetic steel slot is configured to form an included angle, which can more effectively conduct a q-axis flux linkage of the stator 40 into each magnetic flux conducting path more evenly, thereby increasing the q-axis inductance of the motor, and increasing the reluctance torque of the motor.

Further, an included angle A1 is formed between extension lines of side walls of the first bent slot 113 and the second bent slot 114; the side walls of the first bent slot 113 and the second bent slot 114 are adjacent to the straight axis; an included angle A is formed between extension lines of side walls of the first magnetic steel slot segment 111 and the second magnetic steel slot segment 112; and the side walls of the first magnetic steel slot segment 111 and the second magnetic steel slot segment 112 are adjacent to the direct axis, where 2×A≤A1. Such an arrangement can more effectively conduct the q-axis flux linkage of the stator into each magnetic flux conducting path more evenly.

In an embodiment, an included angle B1 is formed between extension lines of side walls of the third bent slot 124 and the fourth bent slot 125; the side walls of the third bent slot 124 and the fourth bent slot 125 are adjacent to the direct axis; an included angle B is formed between extension lines of side walls of the first inner layer magnetic steel slot segment 121 and the third inner layer magnetic steel slot segment 123; and the side walls of the first inner layer magnetic steel slot segment 121 and the third inner layer magnetic steel slot segment 123 are adjacent to the direct axis, where 2×B≤B1. Such an arrangement can more effectively conduct the q-axis flux linkage of the stator into each magnetic flux conducting path more evenly.

Where, 1.1×B1≤A1. Such an arrangement can better conduct the magnetic flux lines into each magnetic flux conducting path more evenly.

In an embodiment, the rotor structure further includes an inner layer permanent magnet, and the inner layer permanent magnet is arranged in the inner layer magnetic steel slot. Such an arrangement facilitates an installation of the inner layer permanent magnet.

In an embodiment, a fifth included angle α1 is formed between the direct axis of the rotor body and a straight line drawn between a center of the rotor body and a point, at which a side edge of the outer layer permanent magnet adjacent to the direct axis of the rotor body and a surface of the outer layer permanent magnet adjacent to an edge of the rotor body intersect. A sixth included angle α2 is formed between the direct axis of the rotor body and a connecting straight line drawn between the center of the rotor body and a point, at which a side edge of the inner layer permanent magnet adjacent to the direct axis of the rotor body and a surface of the inner layer permanent magnet adjacent to the edge of the rotor body intersect. 1.3×(sin α1/sin α2)≤S1/S2≤2×(sin α1/sin α2) is satisfied, where S1 denotes a surface area of one side of the outer layer permanent magnet adjacent to the direct axis of the rotor body, and S2 denotes a surface area of one side of the inner layer permanent magnet adjacent to the direct axis of the rotor body. In an embodiment, 1.5×(sin α1/sin α2)≤S1/S2≤1.8×(sin α1/sin α2). By configuring an arrangement shape of the outer layer permanent magnet and a ratio of a thickness of the inner layer permanent magnet to a thickness of the outer layer permanent magnet, a working point of the permanent magnet can be better adjusted, so that an average working point of the inner permanent magnet and the outer permanent magnet is higher.

The rotor structure in the above embodiments can also be applied in a technical field of motor equipment, that is, according to another aspect of the present disclosure, a permanent magnet auxiliary synchronous reluctance motor is provided. The motor includes a rotor structure, and the rotor structure is any one of the above rotor structures.

The rotor structure in the above embodiment can also be applied in a technical field of vehicle equipment, that is, according to another aspect of the present disclosure, an electric vehicle is provided, including a rotor structure, and the rotor structure is any one of the above rotor structures.

Specifically, the motor includes a stator and a rotor. The stator includes a stator core and a stator winding 41 embedded into the stator core. The rotor includes a slot configured to place a permanent magnet and a permanent magnet placed in the slot. The rotor includes two layers of permanent magnets in a same magnetic pole. The permanent magnets in the same magnetic pole have a same polarity toward the stator. The permanent magnet slot has a shape that protrudes toward an inner side of the rotor. Two ends of the permanent magnet slot approach the outer circle of the rotor. A center of the permanent magnet slot is approximate to the inner side of the rotor. The outer layer permanent magnet slot is roughly V-shaped. A length of the permanent magnet in one side of the V-shaped permanent magnet slot is L, and a maximum width of the permanent magnet arranged in the V-shape slot is C, where $0.8*C \leq L$ is satisfied. The inner layer permanent magnet 30 is roughly U-shaped and includes at least three segments of permanent magnets, as shown in FIG. 1. Through the above arrangement, more permanent magnets can be placed in the unit volume of the rotor to generate larger permanent magnet torque, thereby improving the efficiency of the motor.

Further, a ratio of an area of the side surface of the outer layer permanent magnet adjacent to an outer side of the rotor to an area of a side surface of the inner layer permanent magnet 30 adjacent to the outer side of the rotor is S1/S2. An included angle formed by outer vertexes of the end of the outer layer permanent adjacent to an outer surface of the rotor relative to a center of the rotor is $2 \times \alpha 1$, and an included angle formed by outer vertexes of the end of the inner layer permanent adjacent to the outer surface of the rotor relative to the center of the rotor is $2 \times \alpha 2$, the following relationship is satisfied: $1.3 \times \sin \alpha 1/\sin \alpha 2 \leq S1/S2 \leq 2 \sin \alpha 1/\sin \alpha 2$.

By configuring the arrangement shape of the outer layer permanent magnet and a ratio of an area of the inner layer permanent magnet to an area of the outer layer permanent magnet, the working point of the permanent magnet can be better adjusted, so that the average working point of the inner layer permanent magnet and the outer layer permanent magnet is higher, and a ratio of the magnetic flux lines of the inner layer permanent magnet 30 entering the outer layer permanent magnet to magnetic flux lines of the inner layer permanent magnet directly entering the stator 40 is more reasonable, thereby increasing the permanent magnet flux linkage of the motor, and improving the efficiency and power factor of the motor. The effect of the ratio of the surface area of the inner layer permanent magnet to the surface area of the outer layer permanent magnet on the flux linkage of the motor is shown in the figure. By configuring the ratio of the surface area of the inner layer permanent magnet to the surface area of the outer layer permanent magnet to satisfy $1.3 \times \sin \alpha 1/\sin \alpha 2 \leq S1/S2 \leq 2 \times \sin \alpha 1/\sin \alpha 2$, a larger no-load flux linkage of the motor can be obtained. In an embodiment, $1.5 \times \sin \alpha 1/\sin \alpha 2 \leq S1/S2 \leq 1.8 \times \sin \alpha 1/\sin \alpha 2$.

The permanent magnet of the motor rotor is a ferrite permanent magnet. An arc is drawn by taking the center of the rotor as a center and passes through a midpoint P of an outer sideline of the outermost layer permanent magnet. Along the arc, the sum of thicknesses of the permanent magnets of the rotor accounts for 45%-70% of the circumference of the arc. When the permanent magnets of the motor rotor are ferrite permanent magnets, by setting the thicknesses of the permanent magnets to be within this range, the ratio of the thickness of the permanent magnet to the thickness of the magnetic conducting path is in a better range, which can ensure that the working points of the permanent magnets are higher, thereby achieving larger anti-demagnetization capability and higher no-load flux linkage of the motor. Moreover, the motor can achieve a larger inductance difference between the quadrature axis inductance and the direct axis inductance, thereby improving the reluctance torque of the motor. In an embodiment, along the arc, the sum of thicknesses of the permanent magnets of the rotor accounts for 55%-65% of the circumference of the arc.

In an embodiment, in order to enhance the mechanical strength of the rotor, one or more magnetic barrier bridges are formed in each layer permanent magnet slot. In addition, the inner layer permanent magnet slot is provided with flat permanent magnets at two ends adjacent to the outer circle of the rotor, and the second layer permanent magnet slot is provided with flat permanent magnets at ends adjacent to the outer circle of the rotor. By providing flat permanent magnets at the ends of the magnetic steel slot, more permanent magnets can be arranged in the same rotor, thereby improving the efficiency and the anti-demagnetization ability of the motor.

In an embodiment, the thickness M2 of the plate permanent magnets disposed at two sides of the innermost layer of the rotor is greater than the thickness M1 of the plate permanent magnets disposed at the ends of the second layer, and $1.1M1 \leq M2 \leq 1.8M1$ is satisfied. The study found that when a directional magnetic field is applied to the stator 40, the working point of the inner layer permanent magnets and the working point of the outer layer permanent magnets are different, and the working point of the inner layer permanent magnet is lower than that of the outer layer permanent magnet, which makes the inner layer permanent magnet more prone to local demagnetization, thus affecting the overall anti-demagnetization ability of the motor. In order to alleviate this phenomenon, the thickness M2 of the inner layer permanent magnet is designed to be greater than the thickness M1 of the outer layer permanent magnet. In order to make the inner layer permanent magnet and the outer layer permanent magnet have the same anti-demagnetization capability, $1.1 \times M1 \leq M2 \leq 1.8 \times M1$ is satisfied. In all embodiment, $1.1 \times M1 \leq M2 \leq 1.3 \times M1$.

A magnetic flux conducting path formed by the inner layer rectangular permanent magnet and the outer layer rectangular permanent magnet has a variable width, and the width of part of the magnetic flux conducting path adjacent to the outer surface of the rotor is smaller. By configuring the width the magnetic flux conducting path to be gradually reduced, the magnetic flux areas of the inner layer permanent magnet and the outer layer permanent magnet can be better adjusted to achieve adjustment for consistency of the working points of the inner layer permanent magnet and the outer layer permanent magnet.

Figure 4:
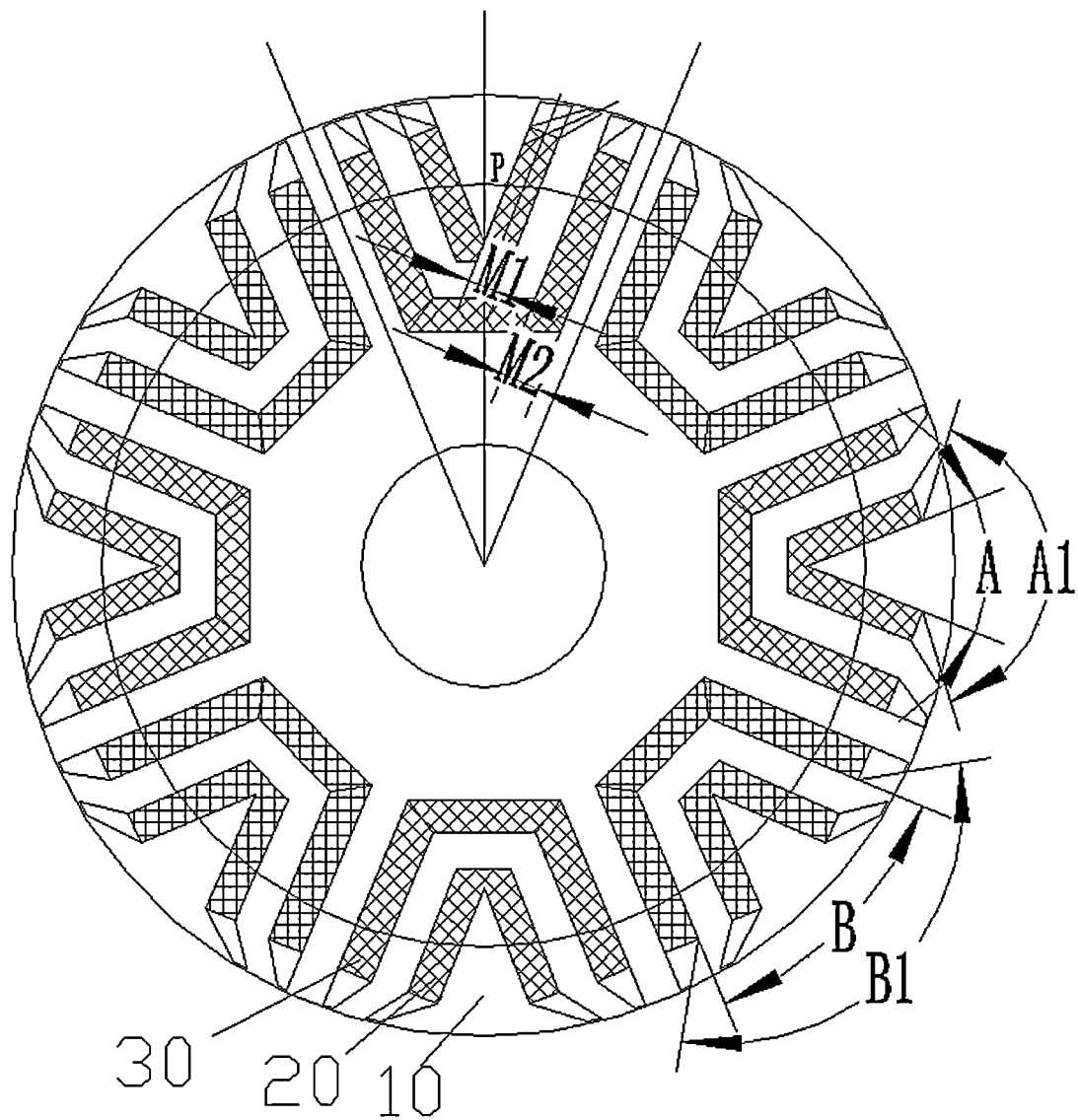
FIG. 4 shows a schematic cross-sectional structure diagram of a fourth embodiment of the rotor structure according to the present disclosure.

As shown in FIG. 4, an end of the outer layer permanent magnet slot of the rotor has a bent portion bending toward an end of the inner layer permanent magnet slot. Such an arrangement can better conduct the directions of the magnetic flux lines.

Figure 2:
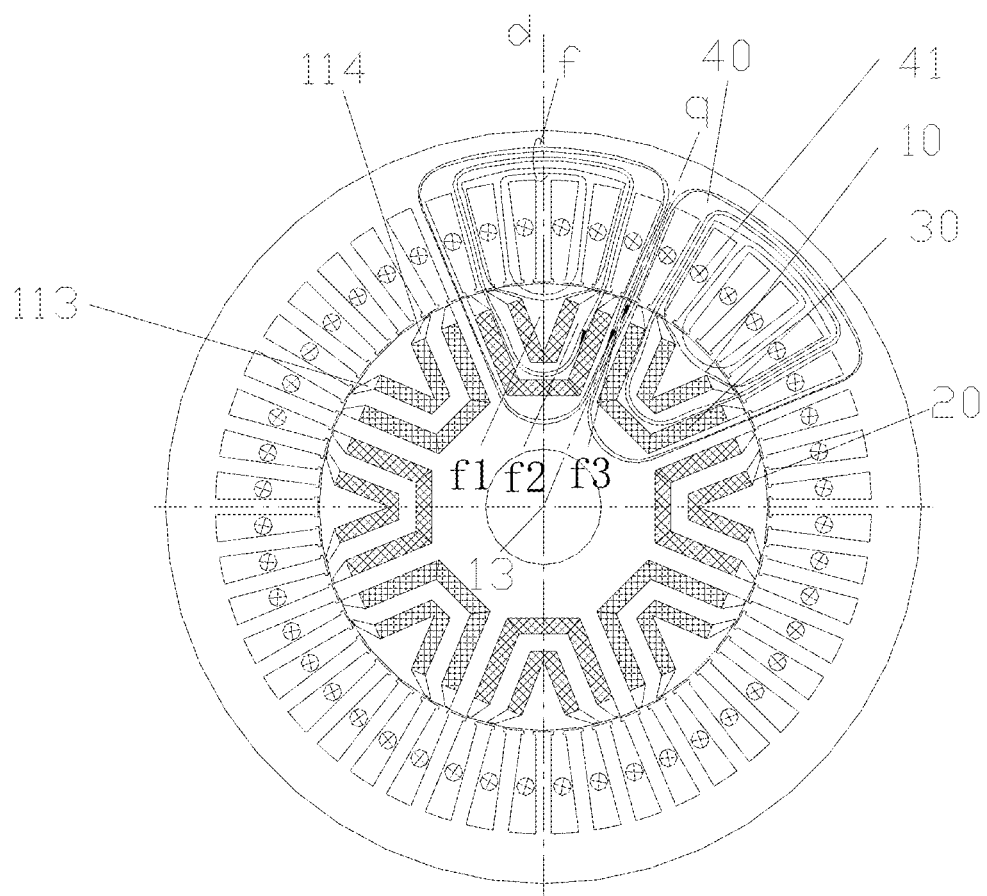
FIG. 2 shows a schematic cross-sectional structure diagram of a second embodiment of the rotor structure according to the present disclosure.
Figure 3:
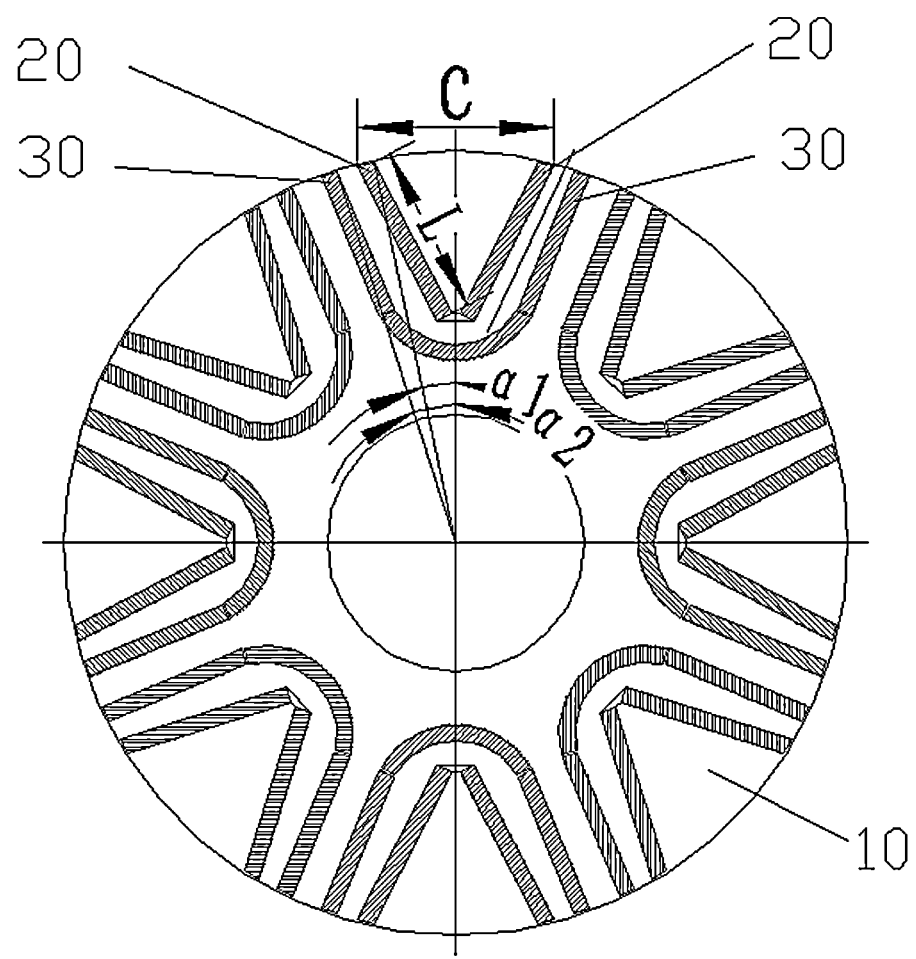
FIG. 3 shows a schematic cross-sectional structure diagram of a third embodiment of the rotor structure according to the present disclosure.
Figure 7:
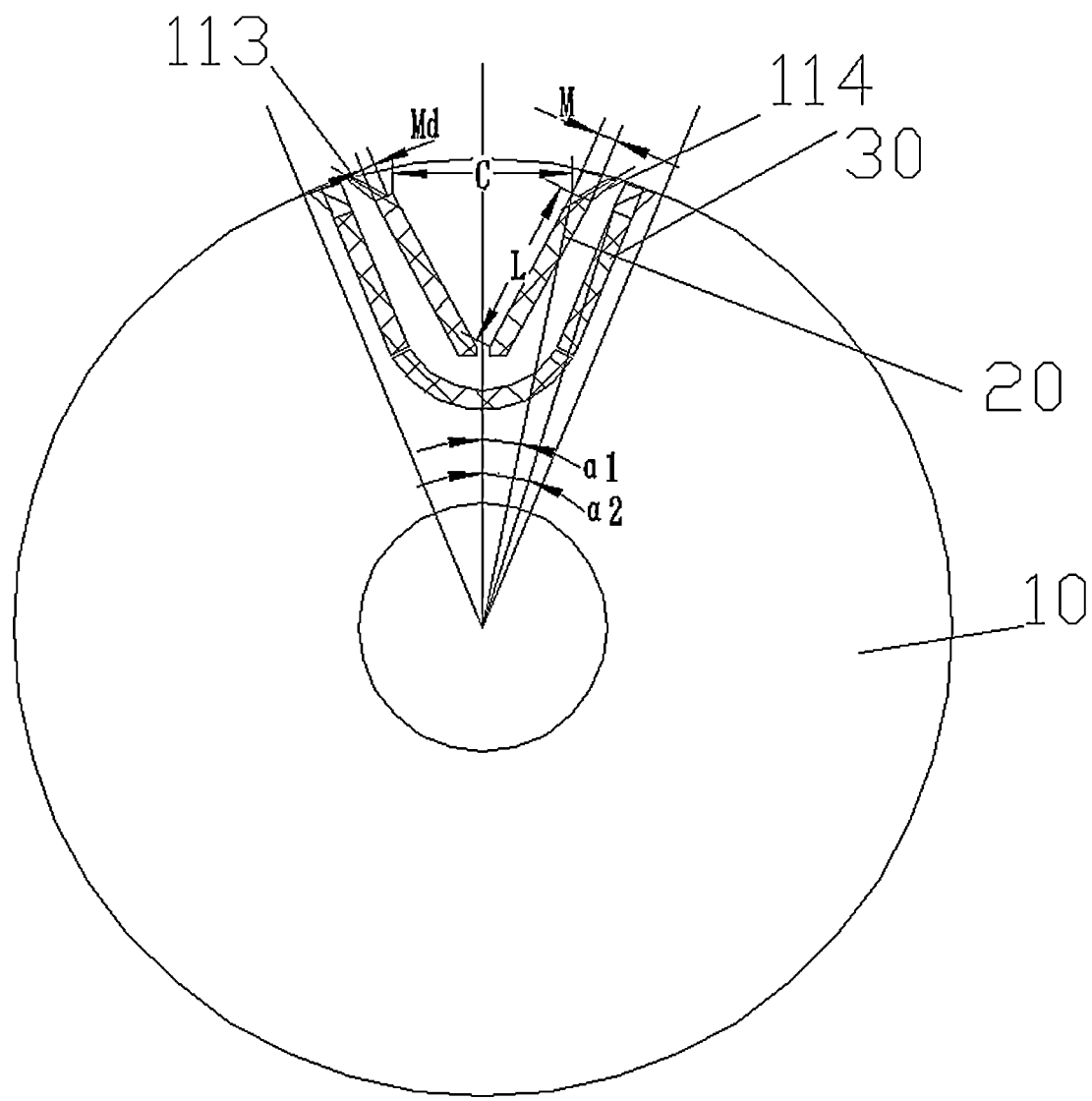
FIG. 7 shows a schematic cross-sectional structure diagram of a seventh embodiment of the rotor structure according to the present disclosure.
Figure 8:
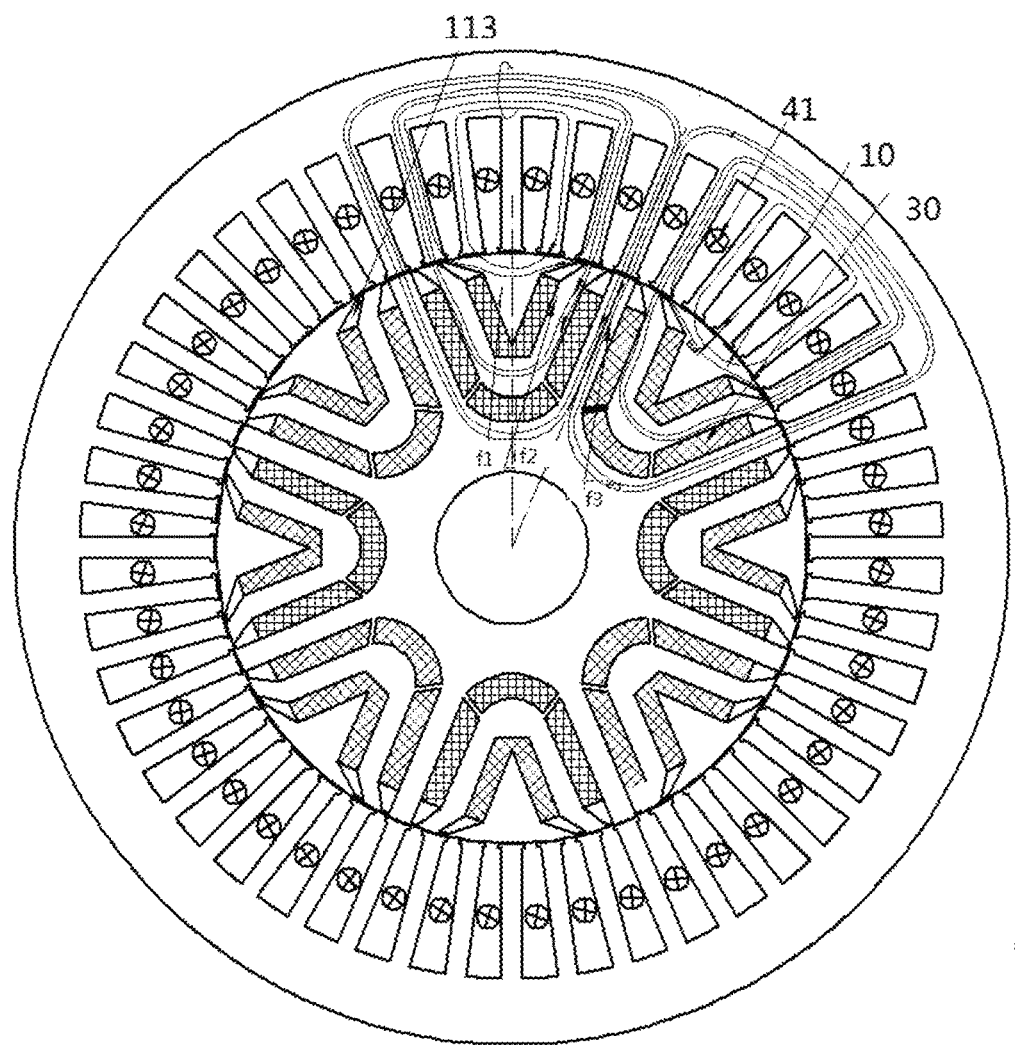
FIG. 8 shows a schematic cross-sectional structure diagram of an eighth embodiment of the rotor structure according to the present disclosure.
Figure 9:
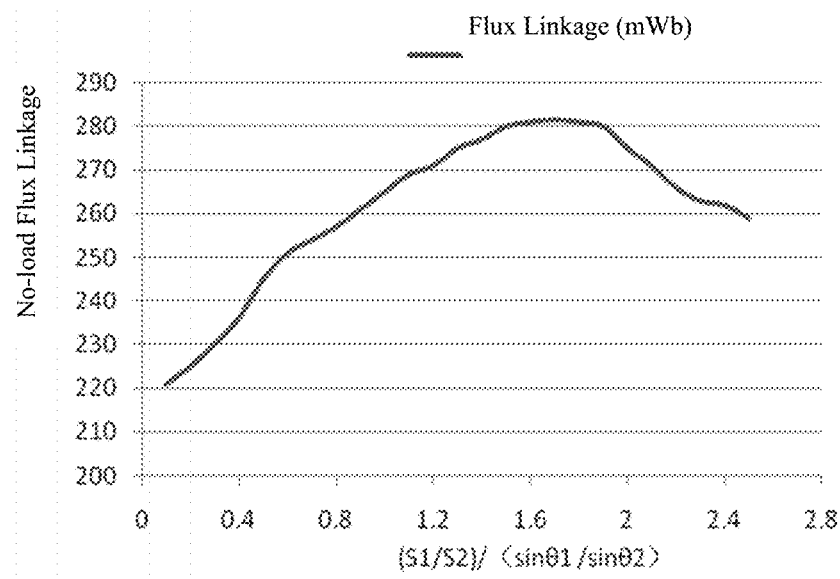
FIG. 9 is a schematic diagram illustrating an influence of a ratio of an area of an inner layer magnetic steel slot to an area of an outer layer magnetic steel slot of the rotor structure on a flux linkage.
Figure 10:
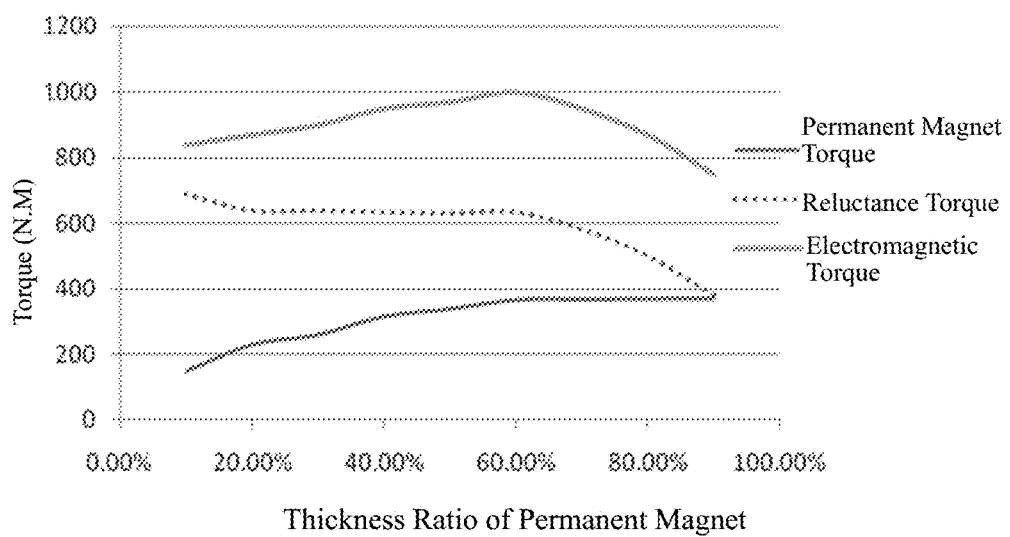
FIG. 10 is a schematic diagram illustrating a relationship between a thickness ratio of a permanent magnet of the rotor structure and torques.
Figure 11:
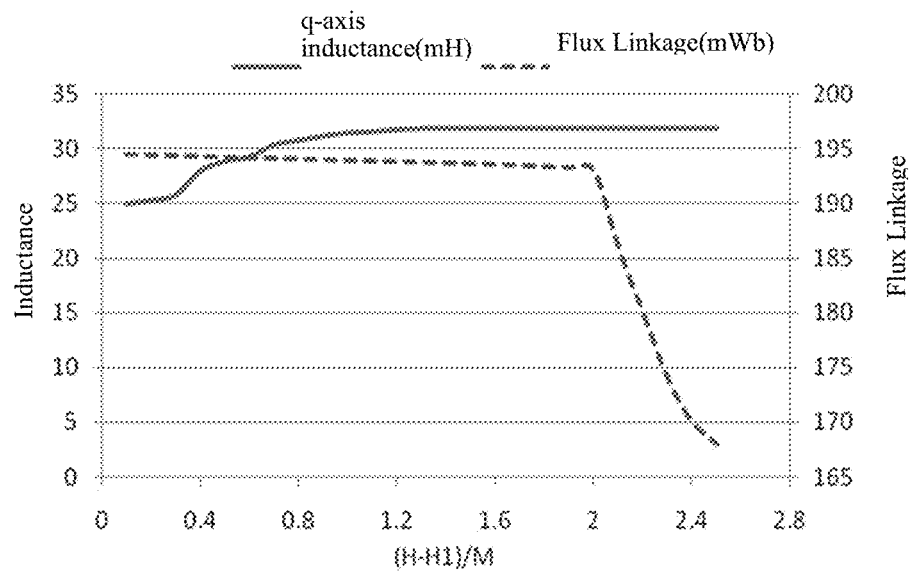
FIG. 11 is a schematic diagram illustrating an influence of a length of a bent slot at an end of a magnetic steel slot of the rotor structure on performance of the motor.

As shown in FIG. 2, the study found that when the motor stator 40 is fed with three-phase symmetrical alternating current power, the magnetic flux lines in each tooth of the stator 40 are not uniform. The closer to a boundary line the tooth of the stator is, the more magnetic flux lines are in the teeth of the stator 40. The q-axis magnetic flux lines f from the stator teeth enter three magnetic flux conducting paths respectively. A magnetic flux conducting path f3 is formed between two innermost layers of magnetic steel slots of adjacent two magnetic poles; a magnetic flux conducting path f2 is formed between the innermost layer magnetic steel slot and a second layer magnetic steel slot; and a magnetic flux conducting path f1 is formed in a magnetic conduction region between the second layer magnetic steel slot and the outer circle of the rotor. Due to an uneven distribution of the magnetic flux lines in the stator teeth, most of the magnetic flux lines enter the magnetic flux conducting path f3, and least of the magnetic flux lines enter the magnetic flux conducting path f1. The magnetic circuits of the magnetic flux conducting path f3 and the magnetic flux conducting path f2 are relatively saturated. When the motor load is larger, the q-axis inductance of the motor will be greatly reduced, thus affecting the usage of the reluctance torque of the motor. This phenomenon becomes more serious especially for a ferrite permanent magnet auxiliary synchronous reluctance motor, which is in a case that, in order to improve the efficiency and anti-demagnetization capability of the motor, the permanent magnet is thicker, and it is difficult to increase the width of the magnetic flux conducting path. Based on this, in the present solution, an end of the magnetic flux conducting path is configured to bend toward the inner layer permanent magnet 30. The distribution of the q-axis magnetic flux lines f of the motor is shown in FIG. 7. By providing the end of the magnetic flux conducting path with a bent portion bending toward the end of the inner layer magnetic steel slot, the q-axis magnetic flux lines f from the stator can be effectively conducted, and the magnetic flux lines which originally enter the high magnetic saturation area, such as the magnetic flux lines originally entering the magnetic channel f2 shown in the figure, are conducted into the low magnetic saturation area like the magnetic channel f1 shown in the figure. Accordingly, more magnetic flux is generated by the same exciting current, thereby improving the q-axis inductance of the motor, increasing the reluctance torque of the motor, and improving the efficiency and the power density of the motor.

Further, the width of the bent portion provided at the end of the magnetic steel slot gradually increases from the outer surface to the inner side of the rotor. By setting the width of the bent portion of the magnetic steel slot to be narrow outside and wide inside, on one hand, an inlet width of the magnetic flux conducting path f2 becomes smaller after the magnetic steel slot bends, thus resulting in a decrease in the q-axis magnetic flux; on the other hand, the magnetic flux lines originally entering the magnetic flux conducting path f2 are, instead, better conducted into the magnetic flux conducting path f3 of the rotor.

In an embodiment, in order to better conduct the magnetic flux lines into the low saturated magnetic flux conducting path other than the high saturated magnetic flux conducting path, $0.6M \leq D3$ is satisfied, where D3 denotes a distance between a midpoint of an end edge of the bent second layer magnetic steel slot and a midpoint of an end edge of the pre-bending second layer magnetic steel slot, and M denotes the width of the unbent portion of the second layer magnetic steel slot adjacent to the end of the rotor. The shape of the end of the pre-bending flux conducting path is determined by the following method: when a flat permanent magnet is installed in the magnetic steel slot, two side edges of the magnetic steel slot are extended, and a distance between an outer edge of the magnetic steel slot adjacent to the outer edge of the rotor and the outer circle of the rotor is identical with the distance between an outer edge of the bent magnetic steel slot adjacent to the outer edge of the rotor and the outer circle of the rotor; when an arc-shaped permanent magnet is installed in the magnetic steel slot, tangent lines at the end points of the arc-shaped magnetic steel slot are extended, and a distance between an outer edge of the magnetic steel slot adjacent to the outer edge of the rotor and the outer circle of the rotor is identical with the distance between an outer edge of the bent magnetic steel slot adjacent to the outer edge of the rotor and the outer circle of the rotor. By controlling the deflection amplitude of the end of the magnetic steel slot and setting D3 to be equal to or greater than 0.6M, better effects of conducting the magnetic flux lines can be achieved, thereby achieving the larger q-axis inductance.

In an embodiment, compared with an inner side end point of the terminal edge of the pre-bending second layer magnetic steel slot, an outer side end point of the terminal edge of the bent second layer magnetic steel slot is closer to the q-axis of the rotor. In this way, better effects of conducting the magnetic flux lines can be achieved.

Further, Ga denotes a distance between the end point of the end edge of the bent second layer magnetic steel slot adjacent to the outer side and the end point of the end edge of the pre-bending second layer magnetic steel slot adjacent to the inner side, and the distance Ga is approximately an integer multiple of an air gap length g between the stator and the rotor. By setting the distance Ga to be approximately the integer multiple of the air gap length g between the stator and the rotor, the content of the harmonic magnetic field in the air gap can be effectively reduced, thereby reducing the harmonic loss and the torque ripples of the motor, the range herein is from 0.95 times to 1.05 times.

Further, the length of the bent portion at the end of the second layer magnetic steel slot is H−H1, and the width of the end of the unbent portion of the magnetic steel slot is M, and $0.4 \times M \leq (H-H1)$ is satisfied. Where H denotes the distance from the outer edge of the bent portion of the magnetic steel slot to the outer circle of the rotor; H1 denotes a thickness of the magnetic barrier bridge formed between the bent portion of the magnetic steel slot of the rotor and the outer circle of the rotor; and M denotes the width of the end of the unbent portion of the magnetic steel slot.

Figure 5:
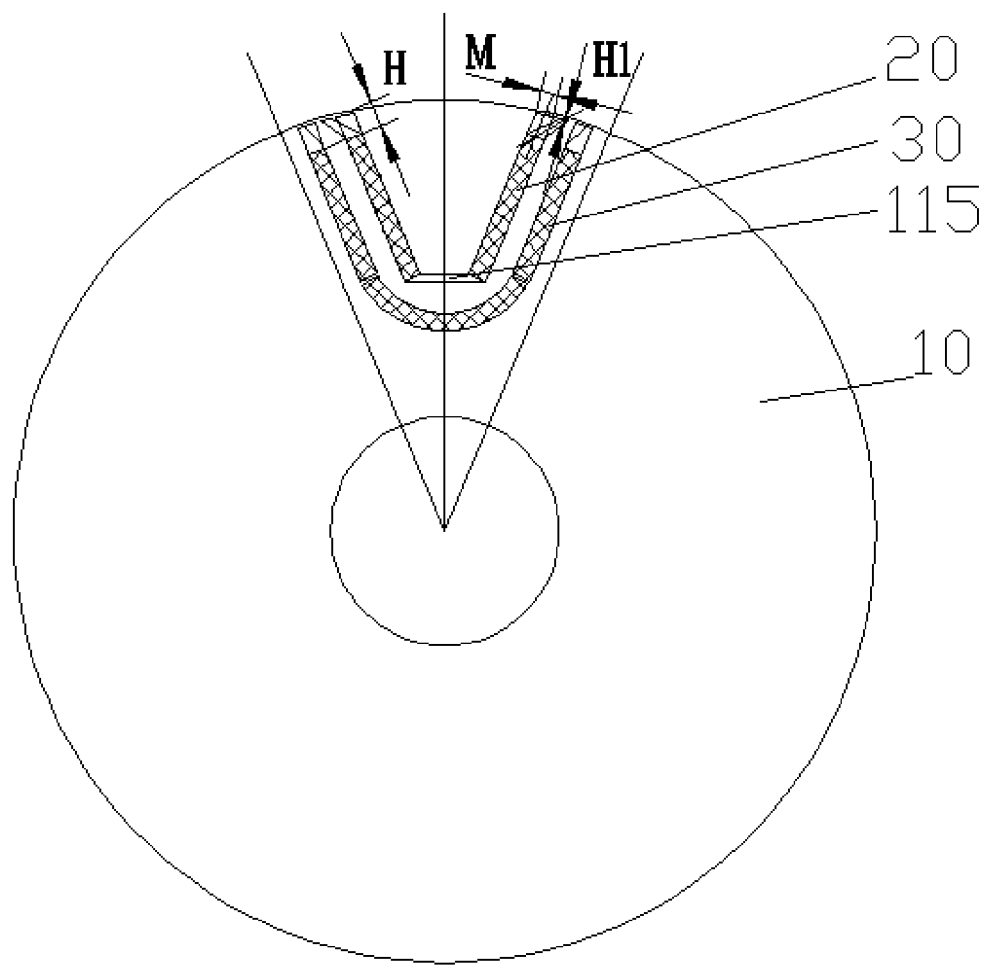
FIG. 5 shows a schematic cross-sectional structure diagram of a fifth embodiment of the rotor structure according to the present disclosure.
Figure 6:
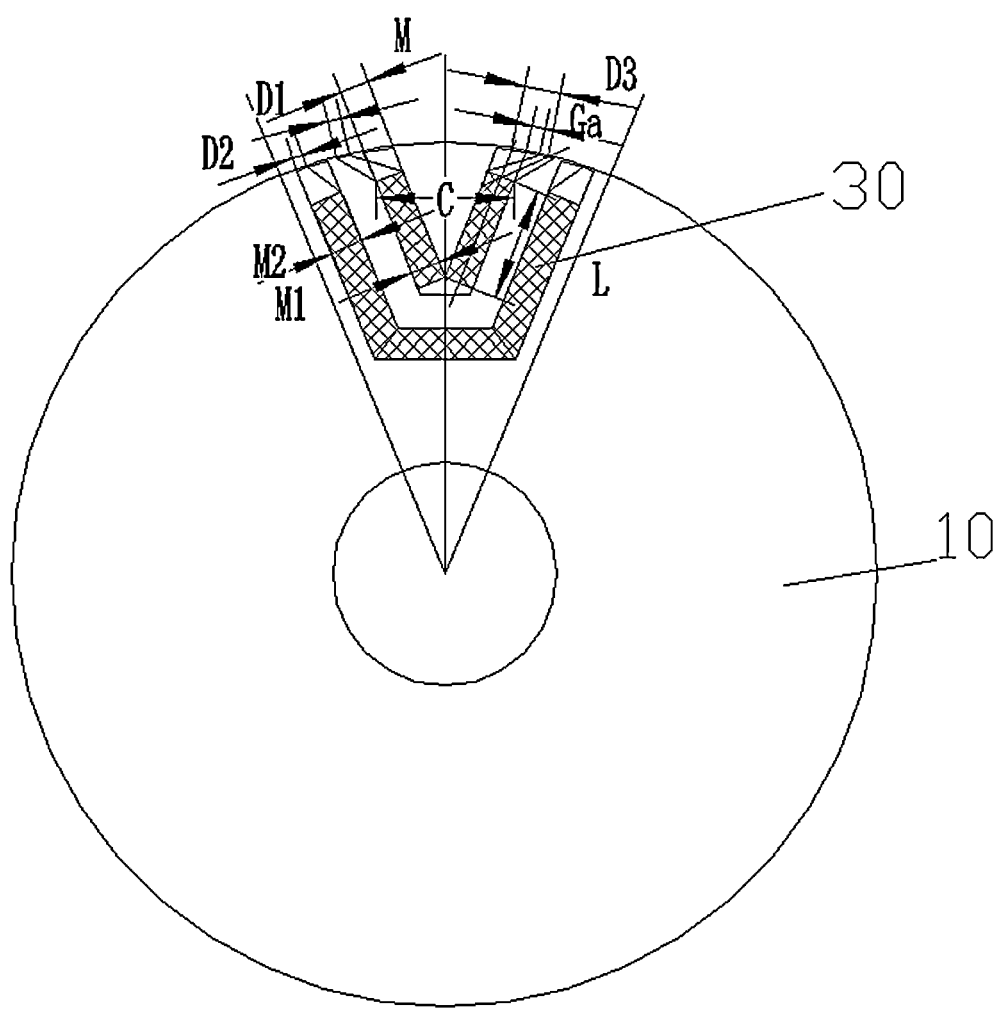
FIG. 6 shows a schematic cross-sectional structure diagram of a sixth embodiment of the rotor structure according to the present disclosure.

As shown in FIG. 5, the study found that the length of the bent section of the magnetic steel slot has a greater effect on the q-axis inductance and the flux linkage of the motor. When $0.4 \times M \leq (H-H1)$, the q-axis inductance can be significantly improved, but if (H−H1) is greater than $2 \times M$, the magnetic flux area the second layer permanent magnet will decrease, which will result in a decrease in the no-load flux linkage of the motor. Therefore, in an embodiment, $0.4 \times M \leq (H-H1) \leq 2 \times M$.

As shown in FIG. 5, in order to better fix the permanent magnet, the width Md of an end of the bent portion of the second layer magnetic steel slot, which is adjacent to the inner side of the rotor, is smaller than the width M of the terminal end of the unbent portion of the magnetic steel slot. The width D1 of the terminal end of the bent portion of the second layer magnetic steel slot is smaller than the width M of the terminal end of the unbent portion of the second layer magnetic steel slot, and $0.25 \times M \leq D1 \leq 0.8 \times M$, in an embodiment, $0.3 \times M \leq D1 \leq 0.45 \times M$.

Figure 12:
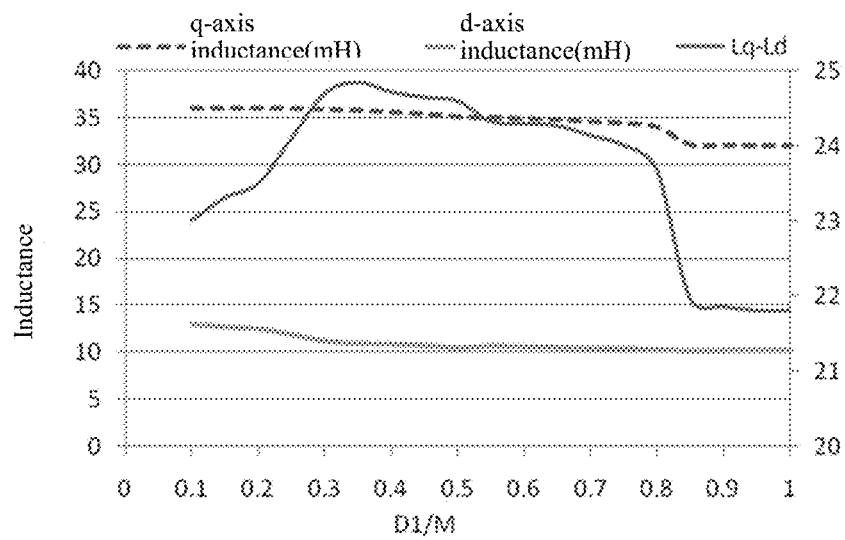
FIG. 12 is a schematic diagram illustrating an influence of a width of an end of the bent slot of the rotor structure according to the present disclosure on parameters of the motor.

The study found that the width D1 of the terminal end of the bent portion of the magnetic steel slot has a certain effect both on the quadrature-axis inductance and the direct-axis inductance of the motor. As shown in FIG. 12, when the width D1 is greater than $0.8 \times M$, the terminal end of the magnetic steel slot has greater reluctance to the q-axis magnetic flux, thus resulting in a decrease in the q-axis inductance. If the width D1 is less than $0.25 \times M$, the magnetic flux lines of the d-axis inductance can easily pass through the magnetic barrier bridge between the magnetic steel slot and the outer circle of the rotor. In order to achieve a greater inductance difference between the quadrature-axis inductance and the direct-axis inductance and improve the reluctance torque of the motor, $0.25 \times M \leq D1 \leq 0.8 \times M$ is satisfied. Further, $0.3 \times M \leq D1 \leq 0.45 \times M$. In addition, no permanent magnet is arranged in the bent portion at the terminal end of the magnetic steel slot, which can effectively slow down the local demagnetization at the terminal end of the permanent magnet and improve the anti-demagnetization ability of the motor.

In an embodiment, A1 denotes an included angle formed by the outer side edges of the bent portions of the outer layer magnetic steel slot, and A denotes an included angle formed by the outer side edges of the unbent portions of the outer layer magnetic steel slot, where 2×A≤A1. The outer surfaces of the ends of the inner layer magnetic steel slot have cut edges. B1 denotes an included angle formed by the outer side edges of the portions with cut edges of the inner layer magnetic steel slot, and B denotes an included angle formed by the outer side edges of the portions without cut edges of the inner layer magnetic steel slot, where 2×B≤B1, and 1.1×B1≤A1. By setting the included angle between the outer side edges of the bent portions and the included angle between the outer side edges of the unbent portions of the magnetic steel slot, the q-axis flux linkage from the stator can be more effectively conducted into each magnetic flux conducting path, thereby increasing the q-axis inductance of the motor, and improving reluctance torque of the motor. The outer surface of the end of the magnetic steel slot of the rotor has a cut edge. D1 denotes a width of the end of the chamfered portion of the magnetic steel slot, and D2 denotes the width of the end of the uncut portion of the magnetic steel slot, where D1≤0.6×D2. The width of the end of the inner layer magnetic steel slot is reduced by means of the cut edge, thereby effectively increasing the magnetic flux entering the rotor from the stator, and improving the q-axis inductance of the motor. The end of the inner layer magnetic steel slot has a bent portion bending toward the pole boundary, which makes the numbers of magnetic flux lines entering the magnetic flux conducting path f2 and the magnetic flux conducting path f3 to be better distributed, thereby reducing the local saturation of the magnetic flux conducting path, and increasing the reluctance torque of the motor. The ends of all magnetic steel slots have bent portions bending toward the pole boundaries, which can further adjust the distribution of magnetic flux lines in each magnetic flux conducting path to reduce local saturation. All rotor poles are evenly distributed on the circumference of the rotor.

The above are only the preferred embodiments of the present disclosure and are not intended to limit the present disclosure. For those skilled in the art, the present disclosure may have various modifications and changes. Any modification, equivalent replacement, and improvement, etc. made within the spirit and principle of the present disclosure shall be included in the protection scope of the present disclosure.

What is claimed is:

1. A rotor structure, comprising:
   a rotor body, wherein, the rotor body is provided with a magnetic steel slot group; the magnetic steel slot group comprises an outer layer magnetic steel slot; the magnetic steel slot group comprises a plurality of magnetic steel slot segments; and at least two of the plurality of the magnetic steel slot segments are arranged in a radial direction of the rotor body and disposed oppositely on both sides of a direct axis of the rotor body; and
   an outer layer permanent magnet, wherein, the outer layer permanent magnet is arranged in the magnetic steel slot segment; a length of the outer layer permanent magnet disposed in two oppositely arranged magnetic steel slot segments is L; a maximum distance between the two oppositely arranged magnetic steel slot segments is C; and 0.8×C≤L;
   the magnetic steel slot group further comprises an inner layer magnetic steel slot; the inner layer magnetic steel slot is disposed on an inner side of the outer layer magnetic steel slot and adjacent to the rotating shaft hole;
   the rotor structure further comprises an inner layer permanent magnet, and the inner layer permanent magnet is arranged in the inner layer magnetic steel slot;
   a fifth included angle α1 is formed between the direct axis of the rotor body and a straight line drawn between a center of the rotor body and a point, at which a side edge of the outer layer permanent magnet adjacent to the direct axis of the rotor body and a surface of the outer layer permanent magnet adjacent to an edge of the rotor body intersect; and a sixth included angle α2 is formed between the direct axis of the rotor body and a straight line drawn between the center of the rotor body and a point, at which a side edge of the inner layer permanent magnet adjacent to the direct axis of the rotor body and a surface of the inner layer permanent magnet adjacent to the edge of the rotor body intersect, wherein, 1.3×(sin α1/sin α2)≤S1/S2≤2×(sin α1/sin α2), S1 denotes a surface area of one side of the outer layer permanent magnet adjacent to the direct axis of the rotor body, and S2 denotes a surface area of one side of the inner layer permanent magnet adjacent to the direct axis of the rotor body.

2. A permanent magnet auxiliary synchronous reluctance motor, comprising a rotor structure, wherein, the rotor structure is the rotor structure according to claim 1.

3. An electric vehicle comprising a rotor structure, wherein, the rotor structure is the rotor structure according to claim 1.

4. The rotor structure according to claim 1, wherein, the plurality of the magnetic steel slot segments comprises: a first magnetic steel slot segment, wherein, a first end of the first magnetic steel slot segment extends toward a rotating shaft hole of the rotor body; a second end of the first magnetic steel slot segment extends toward an outer edge of the rotor body; and the first magnetic steel slot segment is disposed at a first side of the direct axis; and a second magnetic steel slot segment, wherein, the second magnetic steel slot segment is arranged opposite to the first magnetic steel slot segment and disposed at a second side opposite to the first side of the direct axis; a first end of the second magnetic steel slot segment extends toward the rotating shaft hole; and a second end of the second magnetic steel slot segment extends toward the outer edge of the rotor body.

5. The rotor structure according to claim 4, wherein, the outer layer magnetic steel slot further comprises:
   a first slot bent relative to the first magnetic steel slot segment, wherein a first end of the first slot is communicated with the second end of the first magnetic steel slot segment, and a second end of the first slot extends toward the outer edge of the rotor body and gradually approaches one quadrature axis of the rotor body; and
   a second slot bent relative to the second magnetic steel slot segment, wherein a first end of the second slot is communicated with the second end of the second magnetic steel slot segment, and a second end of the second slot extends toward the outer edge of the rotor body and gradually approaching another quadrature axis.

6. The rotor structure according to claim 5, wherein, a width of at least one of the first slot and the second slot gradually decreases outward in a radial direction of the rotor body.

7. The rotor structure according to claim 5, wherein, D3 denotes a distance from a midpoint of a side wall, adjacent to the outer edge of the rotor body, of the second end of the first slot, to an intersection point of an extension line of a geometric center line of the first magnetic steel slot segment from the first end to the second end of the first magnetic steel slot segment and an outer edge of the rotor body adjacent to the second end of the first slot, and M denotes a width of the second end of the first magnetic steel slot segment, wherein 0.6M≤D3.

8. The rotor structure according to claim 7, wherein, a first magnetic barrier bridge is formed between the second end of the first slot and the outer edge of the rotor body; 0.4×M≤(H−H1), or 0.4×M≤(H−H1)≤2×M; wherein M denotes the width of the second end of the first magnetic steel slot segment; H denotes a distance from the second end of the first magnetic steel slot segment to the outer edge of the rotor body; and H1 denotes a width of the first magnetic barrier bridge from the second end of the first slot to the outer circumference of the rotor.

9. The rotor structure according to claim 7, wherein, 0.25×M≤D1≤0.8×M, wherein M denotes the width of the second end of the first magnetic steel slot segment, and D1 denotes a width of the second end of the first slot.

10. The rotor structure according to claim 9, wherein, 0.3×M≤D1≤0.45×M.

11. The rotor structure according to claim 7, wherein, a magnetic flux conducting path is formed between the outer layer magnetic steel slot and the inner layer magnetic steel slot; and the inner layer magnetic steel slot comprises a first inner layer magnetic steel slot segment, a second inner layer magnetic steel slot segment and a third inner layer magnetic steel slot segment arranged in sequence;
the first inner layer magnetic steel slot segment, the second inner layer magnetic steel slot segment and the third inner layer magnetic steel slot segment are communicated with one after another to form a U-shaped structure with an opening toward the outer edge of the rotor body; or
the first inner layer magnetic steel slot segment, the second inner layer magnetic steel slot segment and the third inner layer magnetic steel slot segment are arranged at intervals in sequence, and second magnetic barrier bridges are respectively formed between the first inner layer magnetic steel slot segment and the second inner layer magnetic steel slot segment which are adjacent, and between the second inner layer magnetic steel slot segment and the third inner layer magnetic steel slot segment which are adjacent.

12. The rotor structure according to claim 11, wherein, an included angle B1 is formed between extension lines of side walls of the third slot and the fourth slot; the side walls of the third slot and the fourth slot are adjacent to the direct axis; an included angle B is formed between extension lines of side walls of the first inner layer magnetic steel slot segment and the third inner layer magnetic steel slot segment; and the side walls of the first inner layer magnetic steel slot segment and the third inner layer magnetic steel slot segment are adjacent to the direct axis, wherein 2×B≤B1.

13. The rotor structure according to claim 12, wherein, 1.1×B1≤A1.

14. The rotor structure according to claim 5, wherein, an included angle A1 is formed between extension lines of side walls of the first slot and the second slot; the side walls of the first slot and the second slot are adjacent to the direct axis; an included angle A is formed between extension lines of side walls of the first magnetic steel slot segment and the second magnetic steel slot segment; and the side walls of the first magnetic steel slot segment and the second magnetic steel slot segment are adjacent to the direct axis, wherein 2×A≤A1.

15. The rotor structure according to claim 4, wherein, the plurality of the magnetic steel slot segments further comprises a third magnetic steel slot segment;
a first end of the third magnetic steel slot segment is communicated with the first end of the first magnetic steel slot segment, and a second end of the third magnetic steel slot segment is communicated with the first end of the second magnetic steel slot segment.

16. The rotor structure according to claim 15, wherein, the first magnetic steel slot segment and the second magnetic steel slot segment form a V-shaped structure magnetic steel slot, or
the first magnetic steel slot segment, the second magnetic steel slot segment and the third magnetic steel slot segment form a U-shaped magnetic steel slot.

17. The rotor structure according to claim 4, wherein,
the first inner layer magnetic steel slot segment comprises a third slot bent relative to the first inner layer magnetic steel slot segment; a first end of the third slot is communicated with an end of the first inner layer magnetic steel slot segment, which is adjacent to the outer edge of the rotor body; and a second end of the third slot extends toward the outer edge of the rotor body and gradually approaches one quadrature axis;
the third inner layer magnetic steel slot segment comprises a fourth slot bent relative to the third inner layer magnetic steel slot segment; a first end of the fourth slot is communicated with an end of the third inner layer magnetic steel slot segment, which is adjacent to the outer edge of the rotor body; and a second end of the fourth slot extends toward the outer edge of the rotor body and gradually approaches the other quadrature axis.

18. The rotor structure according to claim 1, wherein, 1.5×(sin α1/sin α2)≤S1/S2≤1.8×(sin α1/sin α2).

* * * * *